Sept. 7, 1954   J. ASHWORTH   2,688,507
SNAP FASTENER FOR BOX COVERS
Filed July 6, 1950   2 Sheets-Sheet 1

Johnnie Ashworth
INVENTOR.

BY
ATTORNEY

Sept. 7, 1954   J. ASHWORTH   2,688,507
SNAP FASTENER FOR BOX COVERS
Filed July 6, 1950   2 Sheets-Sheet 2

Johnnie Ashworth
INVENTOR.

BY
ATTORNEY

Patented Sept. 7, 1954

2,688,507

UNITED STATES PATENT OFFICE 2,688,507

SNAP FASTENER FOR BOX COVERS

Johnnie Ashworth, Taylor County, Tex.

Application July 6, 1950, Serial No. 172,221

12 Claims. (Cl. 292—76)

My invention relates to snap fasteners of the type wherein each of the two elements of the fastener has a cylindrical surface, called herein a snap clip, which snap clips fit one into the other to constitute a snap fastener which hold the two elements together; and in particular to such snap fasteners when used to fasten together elements disposed upon each of two overlying surfaces, such as the covers of cardboard cartons or boxes. Such fastening is shown in my application, Serial No. 150,784 filed March 20, 1950, now Patent No. 2,682,423 granted June 29, 1954, for Latch for Box Covers; and my snap fasteners herein shown are used for the same purpose, and are considered by me to be an improvement upon the latches shown in said patent.

The object of my invention is to provide a snap fastener which may be constructed cheaply, whose two elements may each be readily fastened, one to each surface, which will readily adjust itself to differences in alinement when being snapped together, and which will hold the two elements, and the surfaces to which they are attached, together tightly until released. The two elements being disposed so that the element attached to the overlying surface, or upper cover, is near the outer edge of same, the two elements, when fastened together, are accessible from without, may be released and separated by a simple method by anyone knowing how to do so, and will not be distorted by the method used for such release, but may be used over and over again for fastening and unfastening.

A further object in the use of this device, as of the device shown in my prior application, above referred to, is to provide for the successive closing and opening of the box or carton, thereby preserving the latter for continued use.

Referring now to the drawings, which are a part of this specification, and in which like characters indicate like parts:

Fig. 7 is a plan of a modified form of the upper plate 2a; and

Fig. 8 is a view similar to Fig. 4 showing the modified form of the upper plate 2a, attached to the upper cover.

Figure 1:
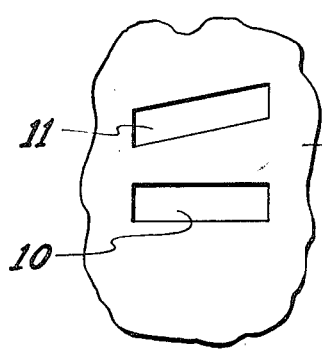
Fig. 1 is a plan view in reduced scale of the under cover 3, showing the slots made therein to receive the lower plate 1.
Figure 2:
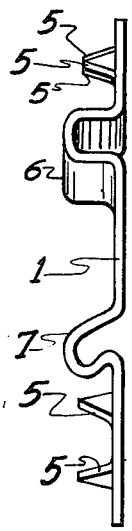
Fig. 2 is a side view.
Figure 3:
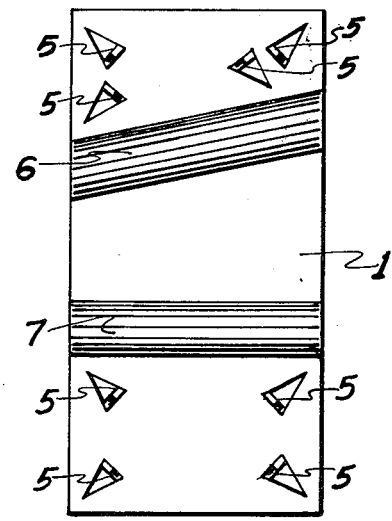
Fig. 3 is a plan of the lower plate 1.

Each of the lower and upper plates 1 and 2 is a strip of resilient metal so cut that its final form is rectangular, as shown, each of the two rectangles being of the same size.

Near one of its ends the lower plate 1 is bent to form a concave snap clip 7 disposed directly across said plate, having a substantially V-shaped cross section, said V-shape being turned at a substantial angle from the perpendicular so that its lower end is further away from the center of the lower plate 1 than is the center between the two upper ends of said V.

Near the other end of the lower plate 1, and at a considerable distance from the concave snap clip 7, I provide a second concave snap clip 6 extending across the surface of the lower plate 1 and having its axis disposed in the horizontal plane of said lower plate 1 at a considerable angle to the axis of the concave snap clip 7. This second concave snap clip 6 likewise has a cylindrical surface which is U-shaped, or preferably inverted capital Omega-shaped, in cross section.

The under cover 3 is slotted at 10, to receive the concave snap clip 7, and at 11 to receive the concave snap clip 6, so that the flat portion of the lower plate 1 may rest upon the upper surface of the under cover 3. This lower plate 1 has near each end a series of down struck triangular prongs 5, by means of which it is bradded to and held by the under cover 3.

The upper plate 2 has been bent so as to provide a convex snap clip 9 corresponding to the concave snap clip 7. This convex snap clip 9 has a cylindrical surface, of canted V-shaped cross section, conforming to, and adapted to fit into the cylindrical surface of the concave snap clip 7. To accomplish this fitting together the upper plate 2 and the convex snap clip 9 must first be at a slight distance from the position where upper plate 2 exactly overlies lower plate 1; and by the fitting together the upper plate 2 is brought back a slight distance to where it does so overlie the lower plate 1. By reason of the canting of the V-shape of each of the snap clips 9 and 7 the upper plate 2, as long as it is held against travel along the greater length of lower plate 1, is firmly held to said lower plate 1. It is obvious that other cooperating means upon the lower plate 1 and upper plate 2 may be used to so hold one plate to the other, but the snap clips 9 and 7 have the advantage that they may be readily made by being bent, each out of the plate, and have a wedging action tending to promote the seating of snap clip 9 into snap clip 7.

The upper plate 2 is further bent to provide a convex snap clip 8 corresponding to the concave snap clip 6 and, like it, has its axis disposed at the same angle in the horizontal plane so that one will overlie the other. This convex snap clip 8 has a cylindrical surface of substantially U-shaped, or preferably inverted Omega shaped cross section, conforming to, but smaller in outline than the cross section of the concave snap clip 6, and thereby adapted to fit into the concave snap clip 6 so that the two may hold together as a snap fastener by reason of the resiliency of each. But before such seating of one in the other can be accomplished the V-shaped convex snap clip 9 must be seated in the V-shaped concave snap clip 7, since the convex snap clip 8 is so spaced upon the upper plate 2 that it can be seated in the concave snap clip 6, only after the other two snap clips 7 and 9 are seated one in the other. The angle at which the axes of the snap clips 6 and 8 are disposed, serves to help in fitting one into the other, thus accommodating for any variation in alinement. The snap clip 8, when fitted into the concave snap clip 6, serves to hold the upper plate 2 against any travel which would permit the convex V-shaped snap clip 9 from getting loose from the concave V-shaped snap clip 7, but may be removed from such fitting together by the application of upward pressure as the first step in separating upper plate 2 from lower plate 1.

At that end of upper plate 2, near which the convex V-shaped snap clip 9 is located, I provide a series of up-struck triangular prongs 5, by means of which it is bradded to, and held by, the upper cover 4. At the other end of upper plate 2 I provide no such fastening means.

Figure 4:
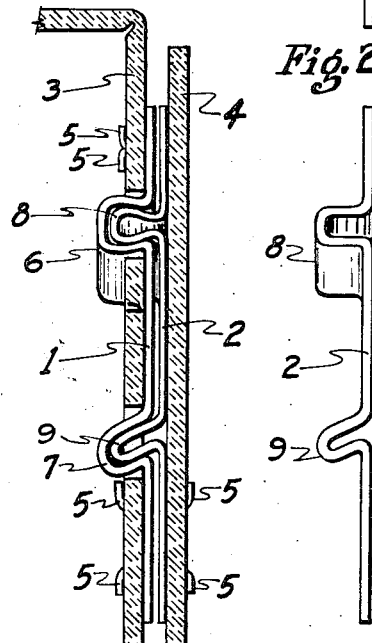
Fig. 4 is a side view, partly in section taken along the outer edges of the lower plate 1 and upper plate 2, showing my snap fastener attached to the upper and under box covers, and having its two elements fastened together.
Figure 5:
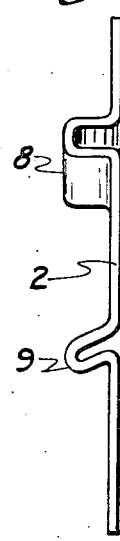
Fig. 5 is a side view.
Figure 6:
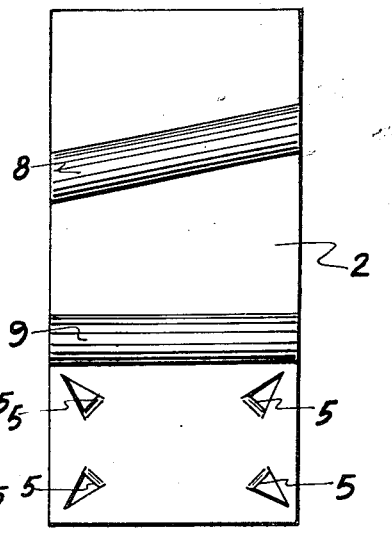
Fig. 6 is a plan of the upper plate 2.

As shown in Fig. 4 the lower plate 1 is fastened to the under cover 3, and the upper plate 2 to the upper cover 4 in such position that, when fastened together, one plate will overlie the other. This position should be near the outer edge of upper cover 4 so that the two plates may be accessible from beyond the said outer edge. I have left the end of upper plate 2 near the convex snap clip 8, not fastened to the upper cover 4, in order that it may be readily lifted to disengage the convex snap clip 8 from the concave snap clip 6, as the first step in separating the upper plate 2 from the lower plate 1. From beyond the outer edge of upper cover 4 any thin tool, such as a knife, may be inserted for applying upward pressure to break the snap fastener hold of convex snap clip 8 to concave snap clip 6, after which the upper cover 4, with upper plate 2 attached, may be moved slightly in a longitudinal direction, or upward as shown in Fig. 4, sufficient to permit separation of snap clip 9 from the snap clip 7, thereby disengaging completely the upper plate 2 from the lower plate 1, and permitting the upper cover 4 to be lifted so that the box may be opened.

Figures 7, 8:
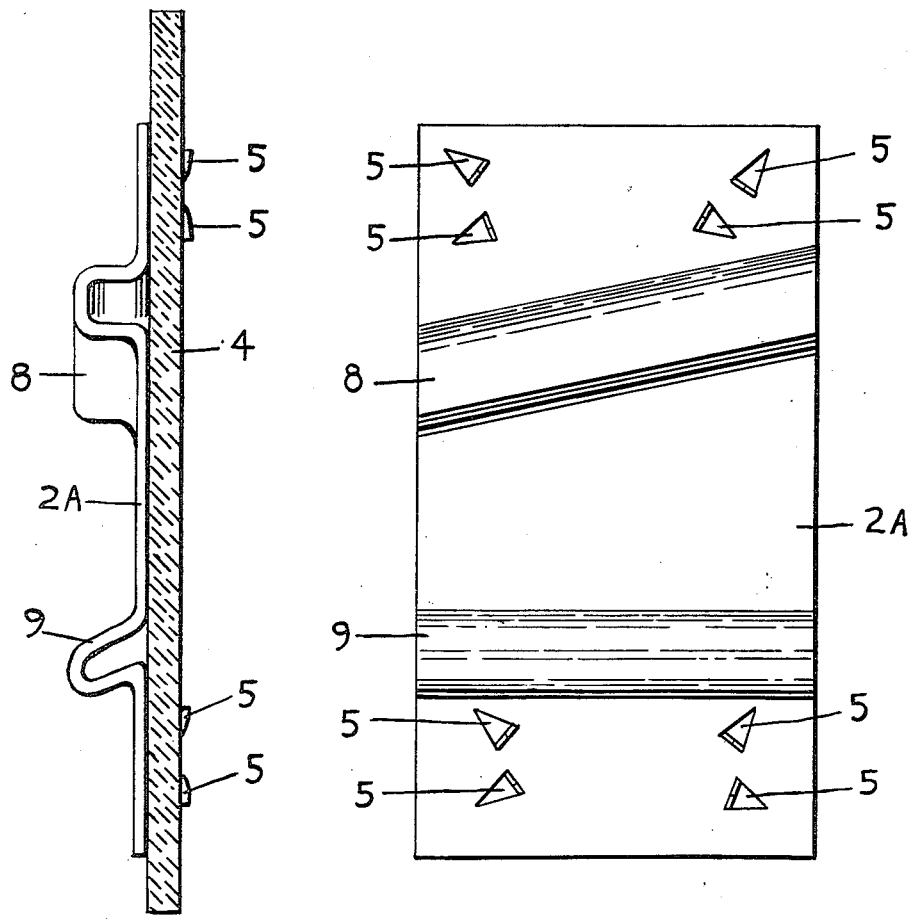

It may be found desirable to substitute for the upper plate 2 a modified form 2a of same, having upstruck triangular prongs 5 at each end, as shown in Figs. 7 and 8, so that both ends may be bradded or fastened to the upper cover 4, especially when the latter is of cardboard or yielding material; but I prefer to leave this end of the upper plate 2 free, so as to insure separation of the snap clip 8 from the snap clip 6, and consider that the fastening of the other end of upper plate 2 to the upper cover 4 will be sufficient to hold the upper cover 4 until the box is ready to be opened.

It will be observed that when my device is used there are no extruding parts which would interfere with stacking of a series of boxes each closed and fastened by my device. The box can be opened and closed repeatedly, so that it can be used and re-used without damage to its covers, and is thereby given a useful life, instead of being good for being opened once and then thrown away.

What I claim as new, and desire to secure by Letters Patent of the United States, is:

1. Matching latch plates having flat portions for fastening together overlying flat members, each plate being attachable to one of the flat members with the flat portions of its inner surface against the surface of the flat member, the first plate having a surface portion extending outward and making an acute angle with the flat surface of the plate, the second plate having a corresponding surface portion extending inward and making an acute angle with the flat surface of the plate, the acute angle corner so formed on the second plate fiting within the acute angle corner so formed on the first plate when the plates are in locking position, a snap fastener element disposed on the first plate at a distance from the corner formed by its said surface portion, and a second snap fastener element on the second plate disposed to fit together with the snap fastener element on the first plate and thereby hold said plates together with the acute angle corner on the second plate fitting within the acute angle corner on the first plate.

2. Matching latch plates having flat portions for fastening together overlying flat members, each plate being attachable to one of the flat members with the flat portions of its inner surface against the surface of the flat member, the first plate having a surface portion extending outward and making an acute angle with the flat surface of the plate, the second plate having a corresponding surface portion extending inward and making an acute angle with the flat surface of the plate, the acute angle corner so formed on the second plate fitting within the acute angle corner so formed on the first plate when the plates are in locking position, a snap clip disposed on one plate at a distance from the acute angle corner formed thereon having a rounded cylindrical convex outer surface, and a second snap clip disposed on the other plate in a position opposite to the first snap clip, and having a rounded cylindrical concave outer surface, said snap clips fitting together to coact as a snap fastener and thereby hold said plates together with the acute angle corner on the second plate fitting within the acute angle corner on the first plate.

3. Matching latch plates having flat portions for fastening together overlying flat members, each plate being attachable to one of the flat members with the flat portions of its inner surface against the surface of the flat member, the first plate having a surface portion extending outward and making an acute angle with the flat surface of the plate for the entire width of the plate, the second plate having a corresponding surface portion extending inward and making an acute angle with the flat surface of the plate, the acute angle corner so formed on the second plate fitting within the acute angle corner so formed on the first plate when the plates are in locking position, a snap clip disposed on one plate at a distance from the acute angle corner formed thereon having a rounded cylindrical convex outer surface, and a second snap clip disposed on the other plate in a position opposite to the first snap clip and having a rounded cylindrical concave outer surface, said snap clips fitting together to coact as a snap fastener and thereby hold said plates together with the acute angle corner on the second plate fitting within the acute angle corner on the first plate.

4. Matching latch plates having flat portions for fastening together overlying flat members, each plate being attachable to one of the flat members with the flat portions of its inner surface against the surface of the flat member, the first plate having a surface portion extending outward and making an acute angle with the flat surface of the plate for the entire width of the plate, the second plate having a corresponding surface portion extending inward and making an acute angle with the flat surface of the plate, the acute angle corner so formed on the second plate fitting within the acute angle corner so formed on the first plate when the plates are in locking position, a snap clip disposed on one plate at a distance from the acute angle corner formed thereon and having a rounded cylindrical convex outer surface, and a second snap clip disposed on the other plate in a position opposite to the first snap clip and having a rounded cylindrical concave outer surface extending across the entire width of the plate, said snap clips fitting together to coact as a snap fastener and thereby hold said plates together with the acute angle corner on the second plate fitting within the acute angle corner on the first plate.

5. Matching latch plates having flat portions for fastening together overlying flat members, each plate being attachable to one of the flat members with the flat portions of its inner surface against the surface of the flat member, the first plate having a surface portion extending outward and making an acute angle with the flat surface of the plate for the entire width of the plate, the second plate having a corresponding surface portion extending inward and making an acute angle with the flat surface of the plate, the acute angle corner so formed on the second plate fitting within the acute angle corner so formed on the first plate when the plates are in locking position, a snap clip disposed on one plate at a distance from the corner formed thereon having a rounded cylindrical convex outer surface whose axis is at an angle to the line of the acute angle corner formed on said plate, and a second snap clip, disposed on the other plate in a position opposite to the first snap clip, and having a rounded cylindrical concave outer surface extending across the entire width of the plate, said snap clips fitting together to coact as a snap fastener and thereby hold said plates together with the acute angle corner on the second plate fitting within the acute angle corner on the first plate.

6. An underlying flat member, an overlying flat member having an outer edge, and matching latch plates having flat portions for fastening said members together, each plate being attached to one of the flat members with the flat portions of its inner surface against the surface of the flat member and disposed with one end near the outer edge of the overlying flat member when the plates are in locking position, the first plate having on the part thereof away from said outer edge a surface portion extending outward and making an acute angle with the flat surface of the plate, the second plate having a corresponding surface portion extending inward and making an acute angle with the flat surface of the plate, the acute angle corner so formed on the second plate fitting within the acute angle corner so formed on the first plate when the plates are in locking position, a snap clip, disposed on one plate on the part thereof near said outer edge and having a rounded cylindrical convex outer surface, and a second snap clip, disposed on the other plate in a position opposite to the first snap clip and having a rounded cylindrical concave outer surface, said snap clips fitting together to coact as a snap fastener and thereby hold said plates together with the acute angle corner on the second plate fitting within the acute angle corner on the first plate.

7. An underlying flat member, an overlying flat member having an outer edge, and matching latch plates having flat portions for fastening said members together, each plate being attached to one of the flat members with the flat portions of its inner surface against the surface of the flat member and disposed with one end near the outer edge of the overlying flat member when the plates are in locking position, the plate attached to the overlying flat member being fastened thereto only at the end away from said outer edge, but the other plate being attached to the underlying flat member at both ends, the first plate having on the part thereof away from said outer edge a surface portion extending outward and making an acute angle with the flat surface of the plate, the second plate having a corresponding surface portion extending inward and making an acute angle with the flat surface of the plate, the acute angle corner so formed on the second plate fitting within the acute angle corner so formed on the first plate when the plates are in locking position, a snap clip, disposed on one plate on the part thereof near said outer edge and having a rounded cylindrical convex outer surface, and a second snap clip, disposed on the other plate in a position opposite to the first snap clip and having a rounded cylindrical concave outer surface, said snap clips fitting together to coact as a snap fastener and thereby hold said plates together with the acute angle corner on the second plate fitting within the acute angle corner on the first plate.

8. Overlying flat members and matching latch plates having flat portions for fastening said members together, each plate being attached to one of the flat members with the flat portions of its inner surface against the surface of the flat member, the first plate having a surface portion extending outward and making an acute angle with the flat surface of the plate, the second plate having a corresponding surface portion extending inward and making an acute angle with the flat surface of the plate, the acute angle corner so formed on the second plate fitting within the acute angle corner so formed on the first plate when the plates are in locking position, a snap clip disposed on the first plate at a distance from the acute angle corner formed thereon having a rounded cylindrical convex outer surface, and a second snap clip disposed on the second plate in a position opposite to the first snap clip and having a rounded cylindrical concave outer surface, the member to which said second plate is attached being provided with recesses to accommodate the surface portion extending inward and the snap clip on said second plate, said snap clips fitting together to coact as a snap fastener and thereby hold said plates together with the acute angle corner on the second plate fitting within the acute angle corner on the first plate.

9. Matching latch plates having flat portions for fastening together overlying flat members, each plate being attachable to one of the flat members with the flat portions of its inner surface against the surface of the flat member, the first plate having a portion bent outward to form a tongue having that one of its surfaces which is nearer to the end of the plate making an acute angle with the flat surface of the plate, and the other surface of said tongue making an obtuse angle with the flat surface of the plate, the second plate having a portion opposite said tongue bent inward to form a groove corresponding to said tongue, and adapted to fit over same with the acute angle corner of said groove fitting within the acute angle corner of said tongue when the plates are in locking position, a portion of one plate near its other end bent outward to form a snap clip having a rounded cylindrical convex outer surface, a portion of the other plate opposite to said snap clip bent inward to form a second snap clip having a rounded cylindrical concave outer surface, said snap clips fitting together to coact as a snap fastener and thereby hold said plates together with the acute angle corner of said groove fitting within the acute angle corner of said tongue.

10. Matching latch plates having flat portions for fastening together overlying flat members, each plate being attachable to one of the flat members with the flat portions of its inner surface against the surface of the flat member, the first plate having a portion bent outward to form a tongue extending across the entire width of the plate, said tongue having that one of its surfaces which is nearer to the end of the plate making an acute angle with the flat surface of the plate, and the other surface of said tongue making an obtuse angle with the flat surface of the plate, the second plate having a portion opposite said tongue bent inward to form a groove corresponding to said tongue, and adapted to fit over same with the acute angle corner of said groove fitting within the acute angle corner of said tongue when the plates are in locking position, a portion of one plate near its other end bent outward to form a snap clip having a rounded cylindrical convex outer surface, a portion of the other plate opposite to said snap clip bent inward to form a second snap clip having a rounded cylindrical concave outer surface, said snap clips fitting together to coact as a snap fastener and thereby hold said plates together with the acute angle corner of said groove fitting within the acute angle corner of said tongue.

11. Matching latch plates having flat portions for fastening together overlying flat members, each plate being attachable to one of the flat members with the flat portions of its inner surface against the surface of the flat member, the first plate having a portion bent outward to form a tongue extending across the entire width of the plate, said tongue having that one of its surfaces which is nearer to the end of the plate making an acute angle with the flat surface of the plate, and the other surface of said tongue making an obtuse angle with the flat surface of the plate, the second plate having a portion opposite said tongue bent inward to form a groove corresponding to said tongue and adapted to fit over same with the acute angle corner of said groove fitting within the acute angle corner of said tongue when the plates are in locking position, a portion of one plate near its other end bent outward to form a snap clip having a rounded cylindrical convex outer surface, a portion of the other plate opposite to said snap clip bent inward to form a second snap clip extending across the entire width of the plate, and having a rounded cylindrical concave outer surface, said snap clips fitting together to coact as a snap fastener and thereby hold said plates together with the acute angle corner of said groove fitting within the acute angle corner of said tongue.

12. Matching latch plates having flat portions for fastening together overlying flat members, each plate being attachable to one of the flat members with the flat portions of its inner surface against the surface of the flat member, the first plate having a portion bent outward to form a tongue extending across the entire width of the plate, said tongue having that one of its surfaces which is nearer to the end of the plate making an acute angle with the flat surface of the plate, and the other surface of said tongue making an obtuse angle with the flat surface of the plate, the second plate having a portion opposite said tongue bent inward to form a groove corresponding to said tongue, and adapted to fit over same with the acute angle corner of said groove fitting within the acute angle corner of said tongue when the plates are in locking position, a portion of one plate near its other end bent outward to form a snap clip having its axis at an angle to the line of said tongue and of said groove, and having a rounded cylindrical convex outer surface, a portion of the other plate opposite to said snap clip bent inward to form a second snap clip extending across the entire width of the plate, and having a rounded cylindrical concave outer surface, said snap clips fitting together to coact as a snap fastener and thereby hold said plates together with the acute angle corner of said groove fitting within the acute angle corner of said tongue.

References Cited in the file of this patent

UNITED STATES PATENTS

| Number | Name | Date |
| --- | --- | --- |
| 626,973 | Crimmin | June 13, 1899 |
| 805,611 | White | Nov. 28, 1905 |
| 924,254 | Marendowski | June 8, 1909 |
| 1,076,955 | Colegate | Oct. 28, 1913 |
| 1,255,240 | Stamm | Feb. 5, 1918 |